3,299,135
PROCESS FOR THE PREPARATION OF N,N'-
DIMETHYL-N,N'-DINITROSO-OXAMIDE
Basil S. Farah, Rockaway, N.J., assignor to Allied Chemical Corporation, New York, N.Y., a corporation of New York
No Drawing. Filed Nov. 22, 1963, Ser. No. 325,786
4 Claims. (Cl. 260—561)

This invention relates to N,N'-dimethyl-N,N'-dinitroso-oxamide and more particularly to a new and improved process for its preparation.

N,N'-dimethyl-N,N'-dinitroso-oxamide, a known compound has recently received considerable attention as an excellent raw material for the efficient generation of the valuable compound diazomethane. In the laboratory N,N'-dimethyl-N,N'-dinitroso-oxamide may be prepared by treatment of N,N'-dimethyl-oxamide in carbon tetrachloride or glacial acetic acid—acetic anhydride solution either with nitrous gases generated by reaction of $H_2SO_4$ and sodium nitrite or of nitric acid and arsenious oxide. However, these procedures are not entirely satisfactory for large scale operations because they are complicated, harmful vapors are evolved during processing, the yields are low, in the order of 70% or less, and the products are usually obtained in an impure state which for many important commercial operations, requires additional treatment thereby adding to the cost of processing. More recently, it has been proposed to produce N,N'-dialkyl-N,N'-dinitroso-oxamide by reaction of N,N'-dialkyl-oxamide with nitrosyl sulfuric acid. This procedure, however, is also not entirely satisfactory for the same reasons as above i.e., because the reaction is uncontrollable with localized hot spots resulting in the formation of by-products creating purification problems and very low yields in the order of 35–60%.

An object of the present invention is to provide an efficient and economical process for the production of N,N'-dimethyl-N,N'-dinitroso-oxamide. Other objects and advantages will be apparent from the following description of the invention.

I have discovered that increased yields of N,N'-dimethyl-N,N'-dinitroso oxamide with substantially less formation of by-products can be achieved by generating nitrosyl sulfuric acid in situ in the reaction zone at a controlled rate. This may be accomplished according to the present invention by admixing N,N'-dimethyl oxamide with a precursor of nitrosyl sulfuric acid and thereafter converting the precursor in situ to nitrosyl sulfuric acid at a controlled rate causing reaction of said nitrosyl sulfuric acid with N,N'-dimethyl oxamide to form N,N'-dimethyl-N,N'-dinitroso oxamide. The reaction between N,N'-dimethyl oxamide and nitrosyl sulfuric acid is exothermic and quite rapid and the reaction is ordinarily completed in a period between about 20–60 seconds. It is for this reason that admixing the reactants, i.e., N,N'-dimethyl oxamide and nitrosyl sulfuric acid directly creates localized hot spots resulting in by-product formation and decomposition of the products. By employing a precursor of nitrosyl sulfuric acid for the reaction, however, the precursor, during the period of greatest concentration of the N,N'-dimethyl oxamide, acts as a diluent, tempering the reaction and creating a more even distribution of the reactants. As precursor of nitrosyl sulfuric acid is employed nitrosylpyrosulfuric anhydride, a white crystalline solid which is stable indefinitely and which does not evolve harmful vapors at the temperatures required in the process of the present invention. Nitrosylpyrosulfuric anhydride reacts with water to form nitrosyl sulfuric acid according to the following equation:

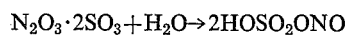
$$N_2O_3 \cdot 2SO_3 + H_2O \rightarrow 2HOSO_2ONO$$

An important feature of the invention is the control of the amount of nitrosyl sulfuric acid generated in the reaction zone. I have found that the water added to the reaction zone to convert the nitrosylpyrosulfuric anhydride to nitrosyl sulfuric acid should be in an amount such that each increment of water added will generate less than about 1/10 of the total amount of nitrosyl sulfuric acid needed for reaction of nitrosyl sulfuric acid with N,N'-dimethyl oxamide until water has been added in an amount sufficient to generate about 75% of the stoichiometric amount of nitrosyl sulfuric acid required for reaction with the N,N'-dimethyl oxamide at which time the balance of the water needed for the conversion may be added. The reaction which takes place may be illustrated by the following equation:

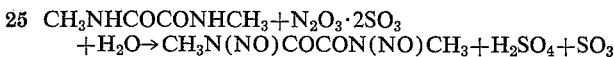
$$CH_3NHCOCONHCH_3 + N_2O_3 \cdot 2SO_3$$
$$+ H_2O \rightarrow CH_3N(NO)COCON(NO)CH_3 + H_2SO_4 + SO_3$$

Although not required for the reaction, I have found that for increased yields and ease of operation, it is preferred to conduct the reaction in the presence of an inert solvent which aids in distributing the reactants. Moreover, since the reaction is normally exothermic, the inert solvent aids in distributing the heat which forms during the reaction. Solvents suitable for the reaction are substantially non-reactive with the reactants or the reaction product under the conditions of the reaction. Some suitable solvents which may be employed in the practice of the invention are, for example, carbon tetrachloride, chloroform, methylene dichloride, benzene, toluene and the xylenes. The amount of solvent employed is not critical, however, it is preferable to maintain a reaction mixture containing a minimum amount of solvent so that the desired product may be easily isolated.

The mole ratio of nitrosyl sulfuric acid to N,N'-dimethyl oxamide utilized in preparing N,N'-dimethyl-N,N'-dinitroso oxamide may be varied from about 1 to 1 to about 3 to 1 respectively. Advantageously, a ratio of about 2 to 1 is employed.

Temperatures employed for the reaction may be varied over a range of 0 to 50° C., preferably 0 to 5° C.

In general, the rate of reaction is increased with increasing temperature, however, excessive subjection of the reaction mass to heat at temperatures above the upper limit may cause decomposition of the product and increase formation of by-products so as to result in decreased yields of the desired N,N'-dimethyl-N,N'-dinitroso oxamide. The reaction is advantageously conducted under atmospheric pressure although superatmospheric or subatmospheric pressure may be employed if desired.

It is usually advantageous to maintain agitation of the reaction mixture for the entire period of the reaction so as to provide proper dispersion of the reactants thereby eliminating the opportunity to create local hot spots.

The order of addition of the nitrosylpyrosulfuric anhydride and N,N'-dimethyl oxamide to the reaction vessel generally is not critical. Thus, the nitrosylpyrosulfuric anhydride may be admixed with the N,N'-dimethyl oxamide and the admixture added to a suitable solvent and thereafter controlled amounts of water added. Alternatively, the nitrosylpyrosulfuric anhydride may be added to the solvent followed by the N,N'-dimethyloxamide and thereafter controlled amounts of water added. Each increment of water constituting about 10% of the water required to generate a stoichiometric amount of acid is added in a period of about one minute or more preferably about 2 to 3 minutes until 75% of the stoichiometric amount of acid required for reaction with the N,N'-dimethyl oxamide is generated at which time the balance of water may be added.

The reaction may be conducted in a conventional reaction vessel equipped with agitating means and cooling means, the latter to maintain the temperature in the required temperature range.

The crude product is generally separated from the reaction medium by evaporating the solution containing the product.

The following example illustrates the invention.

EXAMPLE

A suspension of 118 g. nitrosylpyrosulfuric acid anhydride and 29 g. N,N'-dimethyl oxamide in 400 ml. carbon tetrachloride contained in a reaction vessel which was suspended in an ice salt bath was treated with stirring with a total of 20 ml. of water in one-half hour while the reaction mixture was maintained between 0 and 5° C. The water was added in incremental amounts so that the water added generated less than about $\frac{1}{10}$ of the total amount of nitrosyl sulfuric acid needed for reaction of nitrosyl sulfuric acid with N,N'-dimethyl oxamide until about 75% of the reaction had taken place and thereafter the balance of the water was added. The reaction mixture was stirred one additional hour during which time 200 ml. cold water was added to remove any unconverted nitrosylpyrosulfuric acid anhydride. During the latter period, the reaction temperature was not allowed to exceed 20°. The organic phase was withdrawn and was washed repeatedly with cold water until the washings became neutral. The organic phase was then dried over anhydrous sodium sulfate and solvent was removed in a rotating evaporator at 40° C. and a pressure of 12 mm. mercury. There was obtained 37 g. N,N'-dinitrosodimethyl oxamide melting at 67–68°, without further purification. The yield corresponded to 86% of theory.

Although certain preferred embodiments of the invention have been disclosed for purpose of illustration, it will be evident that various changes and modifications may be made therein without departing from the scope and spirit of the invention.

I claim:

1. A process for producing N,N'-dimethyl-N,N'-dinitroso-oxamide which comprises admixing N,N'-dimethyl oxamide with nitrosylpyrosulfuric anhydride, adding water to said admixture to convert nitrosylpyrosulfuric anhydride to nitrosyl sulfuric acid to effect reaction of said nitrosyl sulfuric acid and N,N'-dimethyl oxamide, said water being added in incremental amounts such that there is generated less than $\frac{1}{10}$ of the total amount of nitrosyl sulfuric acid needed for reaction of nitrosyl sulfuric acid with N,N'-dimethyl oxamide until water has been added in an amount sufficient to generate about 75% of the stoichiometric amount of nitrosyl sulfuric acid required for reaction with the N,N'-dimethyl oxamide and thereafter adding the balance of the water needed for conversion of the nitrosylpyrosulfuric anhydride to nitrosyl sulfuric acid.

2. The process of claim 1 wherein the reaction takes place in the presence of an inert solvent.

3. A process for producing N,N'-dimethyl-N,N'-dinitroso-oxamide which comprises admixing in the presence of carbon tetrachloride, N,N'-dimethyl oxamide with nitrosylpyrosulfuric anhydride, adding water to said admixture to convert nitrosylpyrosulfuric anhydride to nitrosyl sulfuric acid to effect reaction of said nitrosyl sulfuric acid and N,N'-dimethyl oxamide, maintaining the temperature during reaction within the range of 0 to 50° C., said water being added in incremental amounts such that there is generated less than $\frac{1}{10}$ of the total amount of nitrosyl sulfuric acid required for reaction of nitrosyl sulfuric acid with N,N'-dimethyl oxamide until water has been added in an amount sufficient to generate about 75% of the stoichiometric amount of nitrosyl sulfuric acid required for reaction with the N,N'-dimethyl oxamide, each increment of water being added over a period of about 1 to 3 minutes, and thereafter adding the balance of the water needed for conversion of the nitrosylpyrosulfuric anhydride to nitrosyl sulfuric acid.

4. A process for producing N,N'-dimethyl-N,N'-dinitroso-oxamide which comprises admixing in the presence of carbon tetrachloride, N,N'-dimethyl oxamide with nitrosylpyrosulfuric anhydride, adding water to said admixture to convert nitrosylpyrosulfuric anhydride to nitrosyl sulfuric acid to effect reaction of said nitrosyl sulfuric acid and N,N'-dimethyl oxamide, maintaining the temperature during reaction within the range of 0 to 5° C., said water being added in incremental amounts such that there is generated less than $\frac{1}{10}$ of the total amount of nitrosyl sulfuric acid required for reaction of nitrosyl sulfuric acid with N,N'-dimethyl oxamide until water has been added in an amount sufficient to generate about 75% of the stoichiometric amount of nitrosyl sulfuric acid required for reaction with N,N'-dimethyl oxamide, each increment of water being added over a period of about 1 to 3 minutes, adding the balance of the water needed for complete conversion of nitrosylpyrosulfuric anhydride to nitrosyl sulfuric acid, and thereafter separating and recovering N,N'-dimethyl-N,N'-dinitroso-oxamide.

No references cited.

N. S. MILESTONE, *Acting Primary Examiner.*

NATALIE TROUSOF, *Assistant Examiner.*